(12) United States Patent
Archibald et al.

(10) Patent No.: US 12,443,764 B2
(45) Date of Patent: *Oct. 14, 2025

(54) HARD DRIVE ANTI-THEFT PROTECTION

(71) Applicant: NCR Atleos Corporation, Atlanta, GA (US)

(72) Inventors: Kerry Elissa Archibald, Dundee (GB); Graham Flett, Dundee (GB); Anthony Edward Roper, Dundee (GB)

(73) Assignee: NCR Atleos Corporation, Atlanta, GA (US)

( * ) Notice: Subject to any disclaimer, the term of this patent is extended or adjusted under 35 U.S.C. 154(b) by 35 days.

This patent is subject to a terminal disclaimer.

(21) Appl. No.: 18/611,312

(22) Filed: Mar. 20, 2024

(65) Prior Publication Data

US 2024/0232442 A1   Jul. 11, 2024

Related U.S. Application Data

(63) Continuation of application No. 18/087,249, filed on Dec. 22, 2022, now Pat. No. 12,050,721.

(51) Int. Cl.
*G06F 21/80* (2013.01)
*G06F 3/06* (2006.01)
*G06F 21/57* (2013.01)

(52) U.S. Cl.
CPC ............ *G06F 21/80* (2013.01); *G06F 3/0622* (2013.01); *G06F 3/0629* (2013.01); *G06F 3/0674* (2013.01); *G06F 21/575* (2013.01)

(58) Field of Classification Search
CPC ...... G06F 21/575; G06F 21/80; G06F 3/0622; G06F 3/0629; G06F 3/0674
See application file for complete search history.

(56) References Cited

U.S. PATENT DOCUMENTS

| | | | | |
|---|---|---|---|---|
| 2020/0250293 | A1* | 8/2020 | Paulraj | G06F 9/441 |
| 2020/0356673 | A1 | 11/2020 | Xu | |
| 2023/0224296 | A1* | 7/2023 | Demasi | H04L 63/20 726/4 |

FOREIGN PATENT DOCUMENTS

WO    2017200854    11/2017

OTHER PUBLICATIONS

U.S. Appl. No. 18/087,249, filed Dec. 22, 2022, Hard Drive Anti-Theft Protection.
"U.S. Appl. No. 18/087,249, Notice of Allowance mailed Mar. 12, 2024".
"European Application Serial No. 23218237.8, Extended European Search Report mailed May 3, 2024", 5 pgs.

* cited by examiner

*Primary Examiner* — Jane W Benner
(74) *Attorney, Agent, or Firm* — Schwegman Lundberg & Woessner, P.A.

(57) ABSTRACT

Boot firmware of a terminal sets a lock password on a hard disk drive of the terminal to lock the hard disk drive from access. The password is obfuscated in boot variables or stored separately on a server independently of the terminal. During subsequent boots of the terminal, the firmware de-obfuscates the password from the boot variables or obtains the password from the server and provides the password to the hard disk drive, which causes the hard disk drive to unlock for operation with the terminal following the subsequent boots.

20 Claims, 6 Drawing Sheets

HARD DRIVE ANTI-THEFT PROTECTION

CROSS-REFERENCE TO RELATED APPLICATION

This application is a continuation of U.S. patent application Ser. No. 18/087,249, filed Dec. 22, 2022, which application and publication is incorporated herein by reference in its entirety.

BACKGROUND

Transaction terminal hard drives are frequent targets of theft, due to the value of the data on them and the value of the actual drive itself. Hard drives can be locked with a password using a standard ATA command, preventing them from being used if they are stolen. However, this requires manual password entry on the boot to unlock the drive.

The logical and physical security of automated teller machines (ATMs) are constantly under threat, with increasing trends of stealing the hard disks due to the value of the disk and its data. The content of the hard disks can contain encryption keys, protection algorithms and further sensitive and proprietary information.

The information is under threat of attack of being read from a disk that is stolen. In remote locations, with minimal physical security such as a drive-through ATMs, machines are vulnerably to more robust attack types such as damaging the machine to gain access to the safe and devices. The distance from local law enforcement and lack of recording devices, gives criminals more opportunity to attempt breaking into machines as there is no urgency in time. In these cases, the criminals will attempt to extract the hard disk itself as there is value in the device itself by reselling the data contents, this is in addition to more common attacks such as jackpotting the machine.

SUMMARY

In various embodiments, a system and methods for terminal hard disk anti-theft protection are presented. Boot firmware of a terminal permits a password to be set that locks and unlocks the hard disk drive of the terminal during boots of the terminal. The password can be obfuscated and stored in boot variables of the terminal or after initially being set on the hard disk drive, the password can be provided by a server during the boots. The boot firmware locks the hard disk drive with the password and during subsequent boots auto-fills and provides the password to the hard disk drive to unlock the hard disk drive for use with the terminal. Should the hard disk drive be removed from the terminal, the contents of the drive are unusable unless the password is provided to unlock the drive. The password is not available from the hard disk drive such that the hard disk drive by itself does not provide sufficient information for a criminal to unlock the hard disk drive.

DETAILED DESCRIPTION

As discussed above, transaction terminals are increasingly becoming the targets of criminals not just for their currency but for their data, which is stored on the terminals' hard disks. Contents of the disks include valuable information to criminals, such as encryption keys and algorithms that can be used or used with slight modifications on other terminals by the criminals.

Typically, during a boot of a terminal an operator may be required to enter a hard disk password for purposes of unlocking the disk. This is problematic for terminal support when the terminal may be located in remote locations where staff is unavailable to supply the boot password during a boot that happens expectedly or unexpectedly. Whole disk encryption is costly and time consumer and not all terminal owners want to pursue this option. Many terminal owners also deploy a secondary authentication that is remotely performed by a server to authenticate the hard disk. This assumes the terminal has access to a network and can be eliminated with the teachings presented herein.

These issues are resolved with the teachings presented. A hard drive of the terminal is locked such that access can only be acquired via a proper password which was previously set for access on the hard drive. There are two techniques by which the hard drive can be securely locked down without storing the password on the hard drive, one technique for a standalone terminal boot process and one technique for an online terminal boot process.

In the standalone terminal boot process, the password is set using an operating system (OS) utility that executes at the application layer of the OS on the terminal. The utility receives the desired password and sets a firmware variable that is stored in the boot firmware. This causes the terminal core to reboot. During the reboot, the boot firmware obtains the password from the firmware variable, sets the password on the hard drive, obfuscates the password by moving the password to a different firmware variable, the different firmware variable is not capable of being set by the utility for purposes of obfuscating the password (obfuscation can in a variety of manners discussed herein and below). During any subsequent boot of the terminal, the boot firmware reads the obfuscated firmware variable or de-obfuscates to obtain the hard drive password, sends the password to the hard drive to unlock the hard drive, and boots to the hard drive.

In an online terminal boot process, either a server sends the hard drive password to the OS utility, or the OS utility sends the hard drive serial number and hard drive password to the server. The utility stores the password and server address/details in firmware variables causing the terminal core to reboot. During the reboot, the boot firmware reads the corresponding firmware variable to obtain the password, sets the password on the hard drive to unlock it, and saves the server address/details. During any subsequent boot, the boot firmware used an HTTPS boot feature to contact the server and retrieve the password. The password is never saved in the firmware variables. Next, the boot sends the password received from the server to the hard drive to unlock the hard drive and the boot firmware boots to the hard drive.

As used herein, the phrases and terms "hard drive," "hard disk," "hard disk drive," "disk," and/or "drive" can be used interchangeably and synonymously. This refers to a terminal core's storage device or unit.

The phrases and terms "personal computer (PC) core," "terminal core," and "core" can be used interchangeably and synonymously. This refers to the motherboard of a terminal. The terminal can be referred to as a transaction terminal and a transaction terminal can include a self-service terminal (SST), a point-of-sale (POS) terminal, an automated teller machine (ATM), or a kiosk.

Figure 1A:
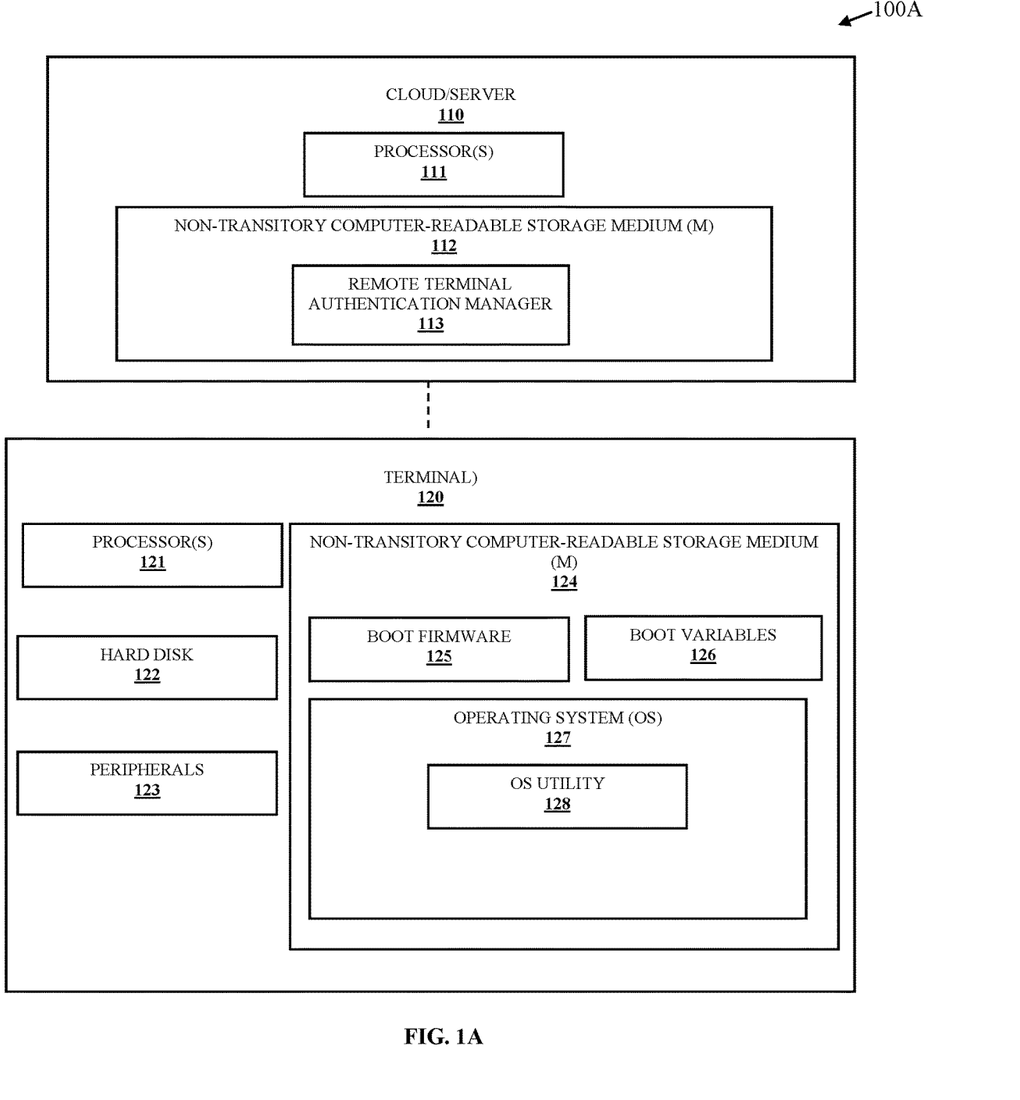
FIG. 1A is a diagram of a system for hard disk anti-theft protection, according to an example embodiment.

FIG. 1A is a diagram of a system 100A for hard disk anti-theft protection, according to an example embodiment. The system 100A is shown in greatly simplified form with only those components necessary to understand and comprehend the embodiments presented. It is noted that more or less components can be provided without departing from the teachings presented herein for hard disk anti-theft protection.

System 100A includes an optional cloud/server 110 and a terminal 120. Optional cloud/server (hereinafter just "server 110") includes at least one processor 111 and a non-transitory computer-readable storage medium (herein after just "medium") 112, which includes executable instructions for a remote terminal authentication manager 113. The instructions when executed by processor 111 cause the processor 111 to perform the operations discussed herein and below with respect to 113.

Terminal 120 includes at least one processor 121, a hard disk/drive (hereinafter "HD") 122, a variety of peripherals 123, and medium 124, which includes executable instructions for boot firmware 125, an OS 127, and an OS utility 128. Medium 124 also includes storage for boot variables 126. The instructions when executed by processor 121 cause processor 121 to perform the operations discussed herein and below with respect to 125, 127, and 128.

System 100A can operate in standalone version of operation or an online version of operation. During a standalone version of operation a password for unlocking HD 122 during a boot of terminal 120 is initially set through utility 128 as is discussed more completely herein and below. During an online version of a password may initially be set through utility 128 but subsequent passwords are provided through remote terminal authentication manager 113 as is discussed more completely herein and below.

Figure 1B:
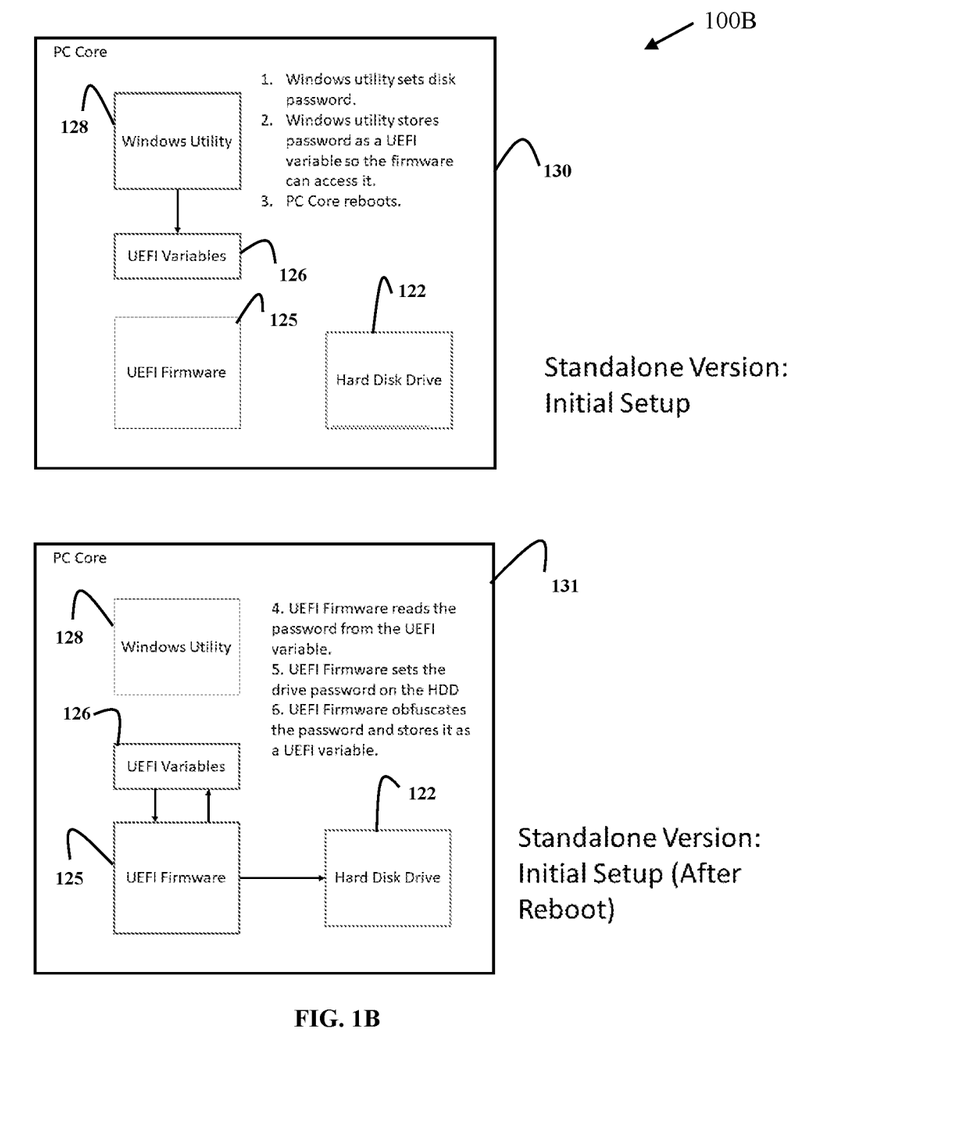
FIG. 1B are diagrams illustrating a stand-alone setup of hard disk anti-theft protection, according to an example embodiment.

FIG. 1B are diagrams 100A illustrating a stand-alone setup of hard disk anti-theft protection, according to an example embodiment. In diagram 130, the terminal/PC core's initial HD password set up is described. Utility 128 processes within OS 127 on terminal 120 and provides a secure administrative interface for changing or setting a password on the HD 122. At 1, a password is received through the administrative interface of utility 128 for setting on the HD 122. At 2, the utility 128 sets the password within a boot variable 126, which is accessible to utility 128 through OS 127. In an embodiment, the boot variables 126 are unified extensible firmware interface (UEFI) variables. At 2, because the boot variable 126 was changed by utility 128, the boot firmware 125 causes the terminal 120 to reboot.

In diagram 131, after the reboot and at 4, the boot firmware 125 (referred to as UEFI firmware in diagram 131) reads the password set in the boot variable 126. At 5, the boot firmware 125 sets the password on the HD 122. Optionally for added security, at 6, boot firmware 125 obfuscates the password by storing the password in a different boot variable 126 from that which was initially set by utility 128. Subsequent boots of terminal for the stand-alone mode of operate are discussed below with the first diagram 140 of FIG. 1C.

Figure 1C:
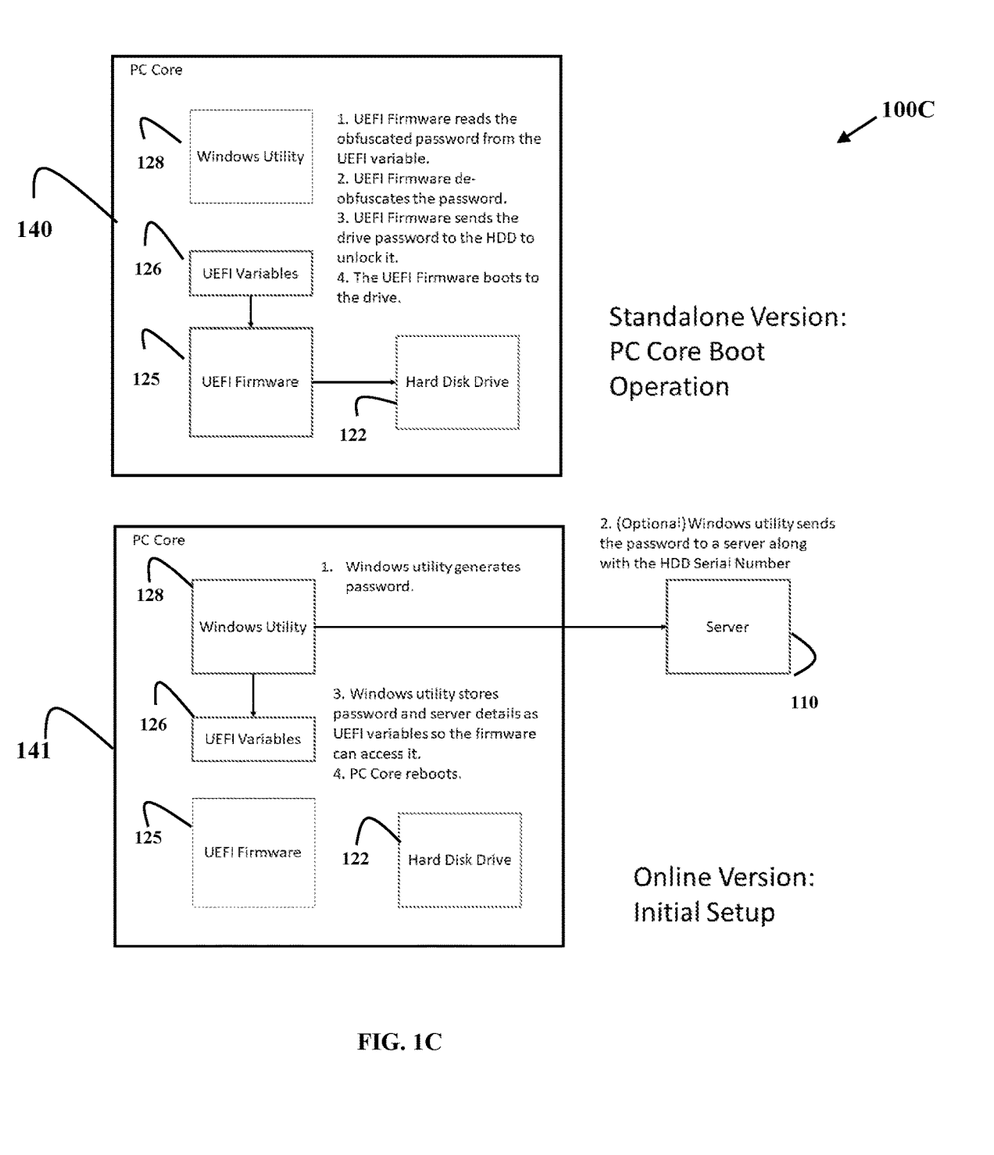
FIG. 1C are diagrams illustrating a terminal core boot after the stand-alone setup and a first portion of an online setup of hard disk anti-theft protection, according to an example embodiments.

FIG. 1C are diagrams 100C illustrating a terminal core boot after the stand-alone setup and a first portion of an online setup of hard disk anti-theft protection, according to an example embodiments.

In diagram 140, subsequent boots of terminal 120 after initial setup and during a standalone mode of operation proceed as follows. At 1, boot firmware 125 reads an obfuscated password from the corresponding boot variable 126. At 2, firmware 125 de-obfuscates the password; at 3, firmware 125 sends the de-obfuscated password to the HD 122, which matches the password set on the HD 122 and causes HD 122 to unlock. At 4, the firmware 125 boots to the unlocked HD 122.

In diagram 141 of FIG. 1C, initial setup of an online setting of a HD password is provided. Initially, at 1, utility 128 generates or receives the HD password through an administrative interface. Optionally, at 2, utility 128 sends the password and a HD serial number for the HD to remote terminal authentication manager 113 over a secure network connection between terminal 120 and server 110. At 3, utility 128 stores the password and server details (i.e., address, secure protocol used, etc.) in firmware variables 126. At 4, boot firmware 125 identifies the boot variables 126 as being set causing terminal 120 to reboot. The firmware 125 processing following the reboot or during the reboot is discussed in diagram 150 of FIG. 1D.

Figure 1D:
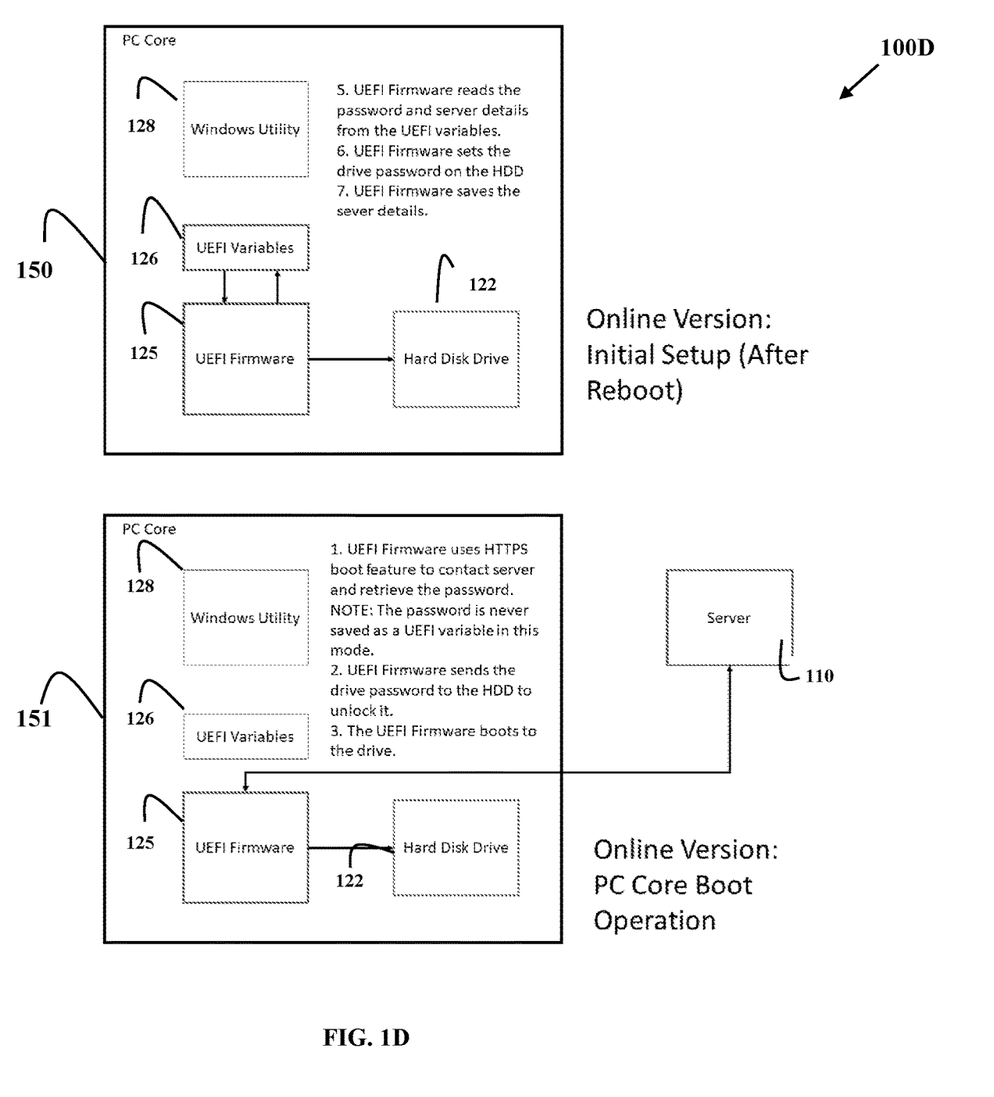
FIG. 1D are diagrams illustrating a second portion of online setup and a terminal core boot after the online setup of hard disk anti-theft protection, according to an example embodiments.

FIG. 1D are diagrams 100D illustrating a second portion of online setup and a terminal core boot after the online setup of hard disk anti-theft protection, according to an example embodiments.

In diagram 150, following initial setup for the online mode of operation, at 5, firmware 125 reads the password and server details from the corresponding firmware variables 126. At 6, firmware 125 sets the password on the HD 122. At 7, firmware 126 saves the server details in a different firmware variable 126 from that which was set by utility 128 in diagram 141.

In diagram 151, following reboot after initial online setup and for subsequent boots of terminal 120, at 1, firmware 125 uses the variable storing the server details to use a specified secure network communication protocol (e.g., HTTPS), boot feature during the boot to contact remote terminal authentication manager 113 of server 110 and retrieve the password for the HD 122. In the online mode of operation for system 100A, the password is never saved in the firmware variables 126 after the reboot from initial online setup. Thus, firmware 125 needs a secure network connection to remote terminal authentication manager 113 during subsequent boots to obtain the password from remote terminal authentication manager 113. Only the server details are saved in a firmware variable 126 for purposes of making the connection to server 110 during the subsequent boots of terminal 120. Firmware 125 obtains the HD password from remote terminal authentication manager 113 during the secure network connection and at 2 sends the password to HD 122 to unlock the HD 122. At 3, firmware 125 boots to HD 122.

In an embodiment, the password can be obfuscated by firmware 125 changing the initial firmware variable 126 set by utility 128 to a different firmware variable 126 that is incapable of being set by utility 128. In an embodiment, the password from the initial set variable 126 can be broken up into and stored in two or more different firmware variables 126 by firmware 125 to obfuscate the password. Firmware 125 is configured to perform an obfuscation algorithm and de-obfuscation algorithm to obtain the password when the password is needed by the HD 122 to unlock the HD 122 during a boot of terminal 120.

In an embodiment, the server details in the online mode of operation can be obfuscated by firmware 125. Firmware 125 can use a same or different set of obfuscation and de-obfuscation algorithms as is used for the password obfuscation.

In an embodiment, firmware 125 sets the password on the HD 122 using an ATA command. The HD 122 is authenticated during boots thereafter by firmware 125 providing a de-obfuscated password recovered from the boot variables 126 to the HD 122. Since the set password, via the ATA command, matches the de-obfuscated password, the HD 122 unlocks and can be booted to by firmware 122.

In an embodiment, existing UEFI firmware of a terminal 120 is extended and enhanced to provide firmware 125.

In an embodiment, utility 128 auto generates the HD password. In an embodiment, utility 128 includes an administrative interface for receiving a HD password.

In an embodiment, peripherals 123 can include one or more touch displays, a media depository, a media recycler, a scanner, a weigh scale, a combined scanner and scale, a handheld scanner, a contact-based card reader, a contactless card reader, a coin accepter, a coin dispenser, a media accepter, a media dispenser, a personal identification number (PIN) pad, an encrypted PIN pad, a bag scale, printer, etc. In an embodiment, the terminal 120 is an ATM, an SST, a POS terminal, or a kiosk.

In the above discussed modes of operation for locking and unlocking a HD 122 or a terminal 120, if HD 122 is removed from terminal 120, the HD 122 remains locked and inaccessible even as a secondary disk. This also means that is no requirement to remotely authenticate the HD 122 with server 110 for the HD 122 to be accessible. Remote HD 122 authentication can still be performed as additional security but is unnecessary with the teachings provided herein. Without the password, the HD's contents cannot be read—this is even without relying on full HD encryption and their associated costs and complexities.

System 100A provides a secure technique by which HDs 122 can be locked and unlocked during boots of a terminal 120. System 100A can leveraged alongside existing security techniques to enhance security of the terminal 120. Alternatively, system 100A can be operated in a completely solo manner should terminal owners desire an alternative low-cost security approach that does not decrease terminal security from what is available with existing whole disk encryption techniques and existing remote disk authentication techniques.

Moreover, firmware 125 auto-fills the boot password for the HD 122. This means that the password does not need to be manually entered during a boot, which makes remote terminal management important when there is no physical presence at the terminal 120 during a boot.

The embodiments discussed above with FIGS. 1A-1D and other embodiments are now discussed with reference to FIGS. 2 and 3.

Figure 2:
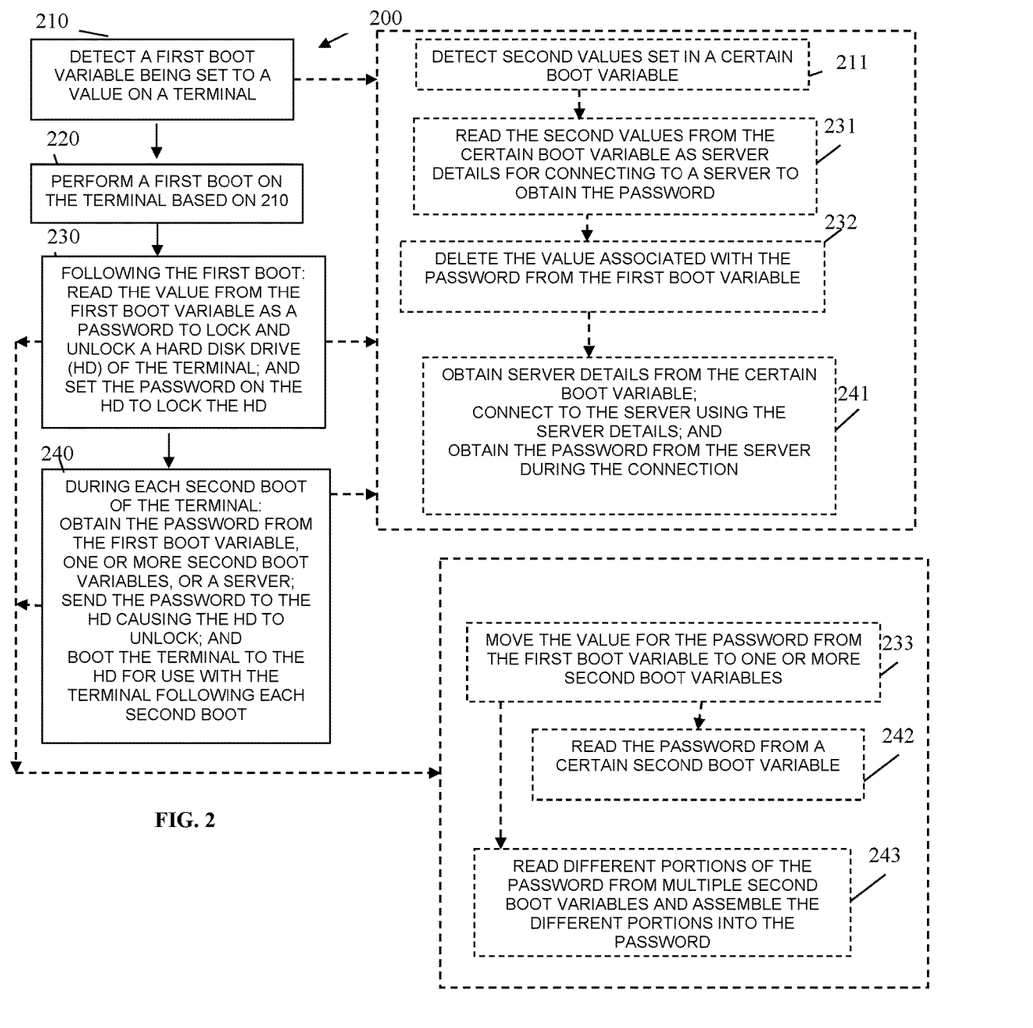
FIG. 2 is a flow diagram of a method for terminal hard disk anti-theft protection, according to an example embodiment.

FIG. 2 is a flow diagram of a method 200 for hard drive anti-theft protection, according to an example embodiment. The software/firmware module(s) that implements the method 200 is referred to as "boot firmware." The boot firmware is implemented as executable instructions programmed and residing within memory and/or a non-transitory computer-readable (processor-readable) storage medium and executed by one or more processors of a device. The processor(s) of the device that executes the boot firmware are specifically configured and programmed to process the boot firmware. The boot firmware may or may not have access to one or more network connections during its processing. Any network connections can be wired, wireless, or a combination of wired and wireless. In an embodiment, boot firmware lacks any network connection during its processing.

In an embodiment, the device that executes the boot firmware is terminal 120. In an embodiment, terminal 120 is an ATM, an SST, a POS terminal, or a kiosk. In an embodiment, boot firmware is boot firmware 125 discussed above with FIGS. 1A-1D.

At 210, the firmware detect a first boot variable 126 being set to a value on a terminal 120. An OS utility 128 can set the value, generate the value, and/or receive the value through an administrative interface. The OS utility 128 has access privileges to change the first boot variable 126 on the terminal 120.

In an embodiment, at 211, the firmware detects second values set in a certain boot variable 126. The certain boot variable 126 associated with a server 110.

At 220, the firmware performs a first boot on the terminal 120 based on detecting of the first boot variable 126 being set to the value at 210.

At 230 and following the first boot, the firmware reads the value as a password to lock and to unlock a hard disk drive (HD) 122 of the terminal 120. The firmware sets the password on the HD 122 to lock the HD 122 requiring the password to unlock the HD 122.

In an embodiment of 211 and 230, at 231, the firmware reads the second values from the certain boot variable 126 as details for connecting to a server 110. The server 110 dynamically supplies the firmware with the HD password for each second boot of the terminal 120 over a network connection between terminal 120 and server 110.

In an embodiment of 231 and at 232, the firmware deletes the value associated with the password from the first boot variable 126. This ensures that the HD password is not stored on the terminal 120 during an online mode of operation as was discussed above with system 100A.

In an embodiment, at 233, the firmware moves the value for the password from the first boot variable 126 to one or more second moot variables 126. This obfuscates the password on the terminal 120 during a standalone mode of operation as was discussed above with system 100A.

At 240 and during each second boot of terminal 120, the firmware obtains the password from the first boot variable 126, the server 110, or one or more second boot variables 126. The firmware sends the password to the HD 122 causing the HD 122 to unlock and the firmware boots the terminal 120 to the HD 122 for use with the terminal 120 following each second boot.

In an embodiment of 233 and 240, at 242, the firmware reads the password from a single certain second boot variable 126.

In an embodiment of 233 and 240, at 243, the firmware reads different portions of the password from multiple second boot variables 126 and assembles the different portions back into the password.

Figure 3:
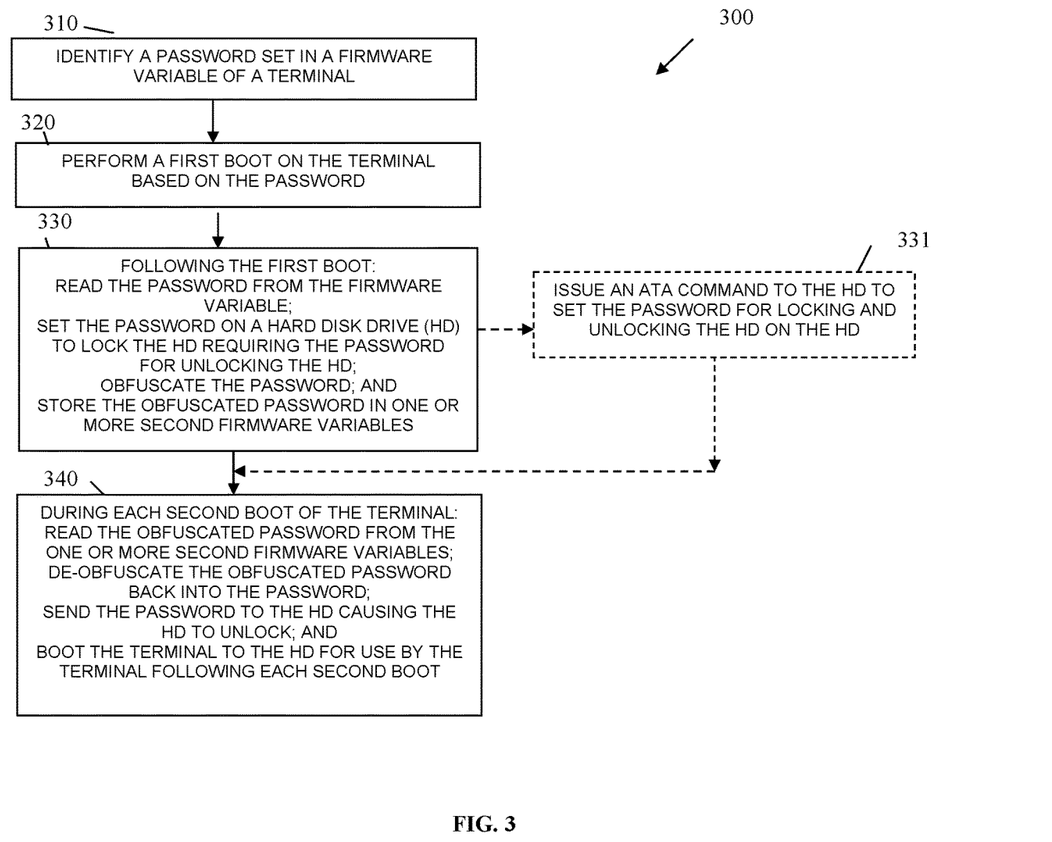
FIG. 3 is a flow diagram of another method for terminal hard disk anti-theft protection, according to an example embodiment.

FIG. 3 is a flow diagram of another method 300 for hard drive anti-theft protection, according to an example embodiment. The software/firmware module(s) that implements the method 300 is referred to as a "hard disk boot verifier." The hard disk boot verifier is implemented as executable instructions programmed and residing within memory and/or a non-transitory computer-readable (processor-readable) storage medium and executed by one or more processors of a device. The processor(s) of the device that executes the hard disk boot verifier are specifically configured and programmed to process the hard disk boot verifier. The hard disk boot verifier may or may not have access to one or more network connections during its processing. Any network connections can be wired, wireless, or a combination of wired and wireless. In an embodiment, the hard disk boot verifier lacks any network connection during its processing.

In an embodiment, the device that executes the hard disk boot verifier is terminal 120. In an embodiment, terminal 120 is an ATM, an SST, a POS terminal, or a kiosk. In an embodiment, hard disk boot verifier is all or any combination of boot firmware 125 and/or method 200 discussed above with FIGS. 1A-1D and FIG. 2.

At 310, the hard disk boot verifier identifies a password set in a firmware variable 126 of a terminal 120. Utility 128 can set the password, generate the password, and or obtain the password through an administrative interface to utility 128. Utility 128 has security access to change values stored in the firmware variable 126 on the terminal 120.

At 320, the hard disk boot verifier performs a first boot on the terminal 120 based on the password. That is, when a value stored in the firmware variable 126 is changed, the hard disk boot verifier forces a boot of terminal 120.

At 330 and following the first boot of terminal 120, the hard disk boot verifier reads the password from the firmware variable 126 and sets the password on a hard disk drive (HD) 122 to lock the HD 122 requiring the password to unlock the HD 122 for access. The hard disk boot verifier obfuscates the password and stores the obfuscated password in one or more second firmware variables 126.

In an embodiment, at 331, the hard disk boot verifier issues an ATA command to the HD 122 to set the password for locking and unlocking the HD 122 on the HD 122. The HD 122 checks a supplied password for a match to what is set on the HD 122 for purposes of unlocking the HD 122 for access on a match.

At 340 and during each second boot of terminal 120, the hard disk boot verifier reads the obfuscated password from the one or more second firmware variables 126 and de-obfuscates the obfuscated password back into the password. The hard disk boot verifier sends the password to the HD 122 causing the HD 122 to unlock. The hard disk boot verifier boots the terminal 120 to the HD 122 for use by the terminal 120 following each second boot.

It should be appreciated that where firmware/software is described in a particular form (such as a component or module) this is merely to aid understanding and is not intended to limit how firmware/software that implements those functions may be architected or structured. For example, modules are illustrated as separate modules, but may be implemented as homogenous code, as individual components, some, but not all of these modules may be combined, or the functions may be implemented in firmware/software structured in any other convenient manner.

Furthermore, although the firmware/software modules are illustrated as executing on one piece of hardware, the firmware/software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A transaction terminal, comprising:
a processor;
a non-transitory computer-readable storage medium comprising executable instructions;
a hard disk drive (HD); and
wherein the executable instructions, when executed by the processor, cause the processor to:
set a password for the HD using a boot firmware during an initial setup process; and
automatically provide the password to the HD to unlock the HD during subsequent operations of the transaction terminal without manual entry of the password;
wherein the password is obfuscated within the boot firmware and not stored on the HD itself.

2. The transaction terminal of claim 1, wherein the boot firmware is configured to perform the obfuscation of the password by encrypting the password using a cryptographic algorithm before storing it within the boot firmware.

3. The transaction terminal of claim 1, wherein the boot firmware is further configured to update the password at predetermined intervals to enhance security.

4. The transaction terminal of claim 1, wherein the boot firmware is further configured to verify an integrity of the hard disk drive before providing the password during the subsequent operations of the transaction terminal.

5. The transaction terminal of claim 1, wherein the boot firmware is further configured to log each instance of providing the password to the hard disk drive for security auditing purposes.

6. The transaction terminal of claim 1, wherein the boot firmware is further configured to restrict access to the password based on a security policy defined within the boot firmware.

7. The transaction terminal of claim 1, wherein the boot firmware is further configured to generate a unique password for the hard disk drive based on a hardware identifier of the transaction terminal.

8. The transaction terminal of claim 1, wherein the boot firmware is further configured to initiate a secure communication channel with a remote server to receive updates to the password.

9. The transaction terminal of claim 1, wherein the boot firmware is further configured to perform a self-test to ensure proper functioning of a password provision mechanism before unlocking the hard disk drive.

10. The transaction terminal of claim 1, wherein the boot firmware is further configured to enable a user to manually override an automatic provision of the password under certain conditions.

11. The transaction terminal of claim 1, wherein the boot firmware is further configured to erase the password from the boot firmware upon detecting unauthorized tampering with the transaction terminal.

12. A method for securing a hard disk drive in a transaction terminal, comprising:
setting a password for the hard disk drive using an operating system utility;
storing the password in a firmware variable that is not directly accessible by the operating system utility after initial setup; and
locking the hard disk drive with the password such that the hard disk drive is inaccessible without the password;
wherein the password is provided by a boot firmware during startup of the transaction terminal to unlock the hard disk drive for normal operation.

13. The method of claim 2, wherein a value set in a first boot variable is generated by the operating system utility based on a randomization process.

14. The method of claim 12, wherein a value set in a first boot variable is derived from a unique identifier of the transaction terminal.

15. The method of claim 12, further comprising verifying an integrity of the hard disk drive before setting the password on the hard disk drive.

16. The method of claim 12, wherein the setting of the password on the hard disk drive includes issuing an Advanced Technology Attachment (ATA) command to the hard disk drive.

17. The method of claim 12, further comprising logging each instance of the password being sent to the hard disk drive in a secure log file within the transaction terminal.

18. The method of claim 12, wherein setting of the password during each second boot includes de-obfuscating the password using a cryptographic key stored separately from the firmware variable.

19. A secure boot management system for a transaction terminal, comprising:
means for receiving and setting a password for a hard disk drive during a boot process of the transaction terminal;
means for obfuscating the password within boot variables of the transaction terminal; and
means for automatically retrieving and providing the password to the hard disk drive to unlock the hard disk drive during subsequent boot processes of the transaction terminal;
wherein the hard disk drive remains locked and inaccessible as a secondary disk when removed from the transaction terminal.

20. The secure boot management system of claim 19, wherein the means for receiving and setting a password further comprises a user interface for inputting the password, and the means for obfuscating the password includes a processor-implemented algorithm to transform the inputted password into an obfuscated format that is stored across multiple non-volatile memory locations within the transaction terminal.

* * * * *